(12) United States Patent
Fukuzawa

(10) Patent No.: US 7,236,275 B2
(45) Date of Patent: Jun. 26, 2007

(54) IMAGE READING APPARATUS AND METHOD OF READING IMAGES

(75) Inventor: Nobumasa Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 10/238,440

(22) Filed: Sep. 9, 2002

(65) Prior Publication Data

US 2003/0048491 A1 Mar. 13, 2003

(30) Foreign Application Priority Data

Sep. 12, 2001 (JP) ............................. 2001-276252

(51) Int. Cl.
- H04N 1/46 (2006.01)
- H04N 1/40 (2006.01)
- H04N 1/04 (2006.01)
- G03F 3/08 (2006.01)

(52) U.S. Cl. ...................... 358/509; 358/505; 358/520; 358/523; 358/514; 358/446; 358/444; 358/461; 358/474; 358/475; 358/496; 358/497

(58) Field of Classification Search ................ 358/496, 358/498, 497, 494, 474, 475, 461, 444, 505, 358/509, 523, 520, 518, 446, 486, 488, 512–514; 399/367, 206, 364, 374, 379, 377; 382/318, 382/319, 312, 274, 275

See application file for complete search history.

(56) References Cited

U.S. PATENT DOCUMENTS 6,128,105 A * 10/2000 Ishikawa et al. ............ 358/483
6,765,697 B2 * 7/2004 Toyoda et al. .............. 358/471
6,822,767 B2 * 11/2004 Kawano et al. ............. 358/496

FOREIGN PATENT DOCUMENTS

| JP | 7-273954 | 10/1995 |
|----|----------|---------|
| JP | 8-335262 | 12/1996 |
| JP | 08335262 A | * 12/1996 |

* cited by examiner

Primary Examiner—Cheukfan Lee
(74) Attorney, Agent, or Firm—Morgan & Finnegan, LLP

(57) ABSTRACT

Disclosed is an image reading apparatus capable of selectively executing a flow-scan reading method in which a document is read while the document is transported in a state in which a reader is fixed at a predetermined location, and a fixed reading method in which a document is read while the reader is moved in a predetermined direction in a state in which the document is held fixed, the apparatus having a first holding member for holding a document at the predetermined location for implementation of the flow-scan reading method, and a second holding member, which has a spectral transmittance different from that of the first holding member, for holding a document for implementation of the fixed reading method. The apparatus discriminates whether the flow-scan or fixed reading method is executed and sets coefficients, which are used in at least the reader or the image processing unit, in accordance with the flow-scan or fixed reading method. Using the set coefficients, a document is read by the reader and processing is applied to the image signal obtained by reading the document.

10 Claims, 8 Drawing Sheets

IMAGE READING APPARATUS AND METHOD OF READING IMAGES

FIELD OF THE INVENTION

This invention relates to an image reading apparatus that is capable of reading a document by a plurality of different methods, and to an image reading method implemented by this image reading apparatus.

BACKGROUND OF THE INVENTION

A variety of image readers have been proposed heretofore. Such an image reader subjects image information from a document to line scanning in the horizontal direction, forms an image of this information on a line sensor such as a CCD serving as reading means, and reads the image information from the document by utilizing an output signal obtained from the CCD.

FIG. 7 is a diagram illustrating an example of the main components of an image reading apparatus according to the prior art. The image reading apparatus shown in FIG. 7 is capable of reading a document by two methods, namely a flow-scan reading method whereby image information is read from documents while the documents are transported and fed one after another, and a fixed reading method whereby the document is held fixed and illuminating and an image forming system is caused to scan the document to read the image information from the document.

As shown in FIG. 7, a first document 301, whose image information is to be read while the document is held fixed, is placed on a platen glass 302 provided at a location where the image information can be read by the fixed reading method. This apparatus includes a light source 303, a slit 304, first, second and third mirrors 305, 306 and 307, respectively, an image forming lens 308, and a line sensor 309 such as a CCD. A second document 310 has its image information read while it is transported by an automatic document feeder, which is not shown. These documents can be transported one after another. A document transport glass 311 is provided at a location where the image information can be read from the document by the flow-scan reading method. The second document 310 passes by the upper side of the document transport glass 311 and is transported by a roller 312.

The document reading operation performed by the flow-scan reading method is such that the image reader optical system, which includes the light source 303, slit 304, first, second and third mirrors 305, 306 and 307, respectively, image forming lens 308 and line sensor 309, is moved to a point underlying the document transport glass 311 before the second document 310 is read.

Next, second documents 310 are transported one after another from the automatic document feeder (not shown). When a second document 310 is transported by the roller 312 and passes by the upper side of the document transport glass 311, the second document 310 is illuminated by the light source 303, the light reflected from the illuminated second document 310 passes through the slit 304 and the document image is formed on the image forming surface of the line sensor 309 by the image forming lens 308 through the intermediary of the first, second and third mirrors 305, 306 and 307. Since the second documents 310 are transported successively and pass by the upper side of the document transport glass 311, a signal based upon the image information of each second document 310 in the main scanning direction thereof is obtained during transport in the sub-scanning direction, whereby the image information of the second document 310 is read.

Thus, by merely providing a document reading section at the forward end of the image reading apparatus and providing a simple automatic document feeder to feed documents, the documents (limited to documents in the form of sheets) are fed automatically to make possible the flow-scan reading of image information.

With the fixed reading method, the first document 301, which has been placed on the platen glass 302, is illuminated by the light source 303, light reflected from the first document 301 that passes through the slit 304 is acted upon by the image forming lens 308 so that an image is formed on the line sensor 309, and the light source 303, slit 304 and first, second and third mirrors 305, 306 and 307 are made to scan the first document 301 in the sub-scanning direction, thereby reading the image information from the first document 301.

By thus reading a document while the document is held fixed, it is possible to read image information from a document bound in book form or from an original that is difficult to feed using an automatic document feeder, such as a thick document or thin fabric.

In an image reading apparatus of the above-described kind, the second document 310 is transported from the automatic document feeder to a point above the document transport glass 311. In order to facilitate transport of the second document 310 and deal with the attachment of contaminants such as dust or the like, the surface of the document transport glass 311 is provided with an electrically conductive film (referred to also as an "EC coat"), such as a film of ITO (Indium Tin Oxide), or is treated to lower the frictional resistance thereof.

More specifically, providing the surface of the document transport glass 311 with an electrically conductive film allows the flow of an electric current, thereby preventing the build-up of electric charge between the second document 310 and the document transport glass 311 so as to enhance transportability of the second document 310. Further, treating the surface of the document transport glass 311 to reduce the frictional resistance thereof lowers the coefficient of friction between the second document 310 and the document transport glass 311, thereby stabilizing transport of the second document 310.

The treatments described above also are effective in preventing the attachment of dust to the document transport glass 311.

In addition, a synergistic effect is obtained by subjecting the surface of the document transport glass 311 to both the conductive-film treatment (the EC coat) and friction reducing treatment simultaneously.

However, when the surface of the document transport glass 311 is coated with the electrically conductive film or treated to lower frictional resistance, this causes a change in the spectral transmittance of the document transport glass 311.

FIG. 8 is a graph illustrating the spectral transmittance of ordinary glass whose surface has not been treated in any way and of treated glass whose surface has been subjected to the conductive-film and low-friction treatments.

FIG. 8 demonstrates that there is a difference between the spectral transmittance (the solid line in FIG. 8) of float plate glass (ordinary glass) of 4-mm thickness (one example) used in an ordinary image reading apparatus, and the spectral transmittance (dashed line in FIG. 8) of glass (treated glass) obtained by subjecting the surface of float plate glass to conductive-film and low-friction treatments.

In general, glass whose surface has been subjected to conductive-film and low-friction treatments exhibits a spectral transmittance lower than that of untreated glass, with the difference being particularly pronounced in the short wavelength region. Consequently, when the surface of the document transport glass 311 is provided with the electrically conductive film or is subjected to the low-friction treatment, the image information obtained by reading a document by the flow-scan reading method will differ from that obtained by reading the document by the fixed reading method.

Further, since the above-mentioned disparity is particularly conspicuous on the side of short wavelengths, the effect of treating the glass is particularly great when image information is read from a color document. This means that color image information obtained by the flow-scan reading method will differ from that obtained by the fixed reading method.

To better understand the above-mentioned phenomenon, consider a case where ordinary glass is used as the platen glass for the fixed reading method and glass, whose surface has been subjected to the conductive-film treatment and low-friction treatment, is used as the document transport glass for the flow-scan reading method. Owing to the difference between the spectral transmittances shown in FIG. 8 in such case, first the light that illuminates the document does not arrive at the document in the same way, then the light reflected from the document is influenced again because it passes through the glass a second time. In other words, the difference in the spectral transmittance of the glass becomes a factor twice, i.e., once for the illuminating light and once for the reflected light, with regard to color information obtained by the flow-scan reading method and color information obtained by the fixed reading method.

In order to solve this problem, subjecting the surface of the platen glass for the fixed reading method to the conductive-film and low-friction treatments has been contemplated. However, the platen glass for reading a fixed document has a size larger than that of the document, as depicted in FIG. 7. Applying an electrically conductive film and friction reducing treatment to the surface of a platen glass that is so much larger than the document would result in much higher cost.

SUMMARY OF THE INVENTION

The present invention has been made in view of the foregoing and its object is to reduce the difference between image information obtained by the flow-scan reading method and image information obtained by the fixed reading method without bringing about an increase in cost.

According to the present invention, the foregoing object is attained by providing a method of reading images in an image reading apparatus capable of selectively executing a first reading method in which a document is read while the document is transported in a state in which a reader is fixed at a predetermined location, and a second reading method in which a document is read while the reader is moved in a predetermined direction in a state in which the document is held fixed, the apparatus having a first holding member for holding a document at the predetermined location for implementation of the first reading method, and a second holding member, which has a spectral transmittance different from that of the first holding member, for holding a document for implementation of the second reading method, the method comprising: a determination step of determining whether the first or second reading method is executed; a reading step of reading a document by the reader; an image processing step of executing processing of an image signal obtained at the reading step; and a coefficient setting step of setting coefficients, which are used in at least the reading step or the image processing step, in accordance with the first or second reading method; wherein processing is executed at the reading step and the image processing step using the coefficients set at the coefficient setting step so as to compensate for the difference between the spectral transmittances of the first and second holding members.

According to the present invention, the foregoing object is attained by providing an image reading apparatus capable of selectively executing a first reading method in which a document is read while the document is transported in a state in which a reader is fixed at a predetermined location, and a second reading method in which a document is read while the reader is moved in a predetermined direction in a state in which the document is held fixed, the apparatus comprising: a first holding member adapted to hold a document at the predetermined location for implementation of the first reading method; a second holding member, which has a spectral transmittance different from that of the first holding member, adapted to hold a document for implementation of the second reading method; a determination unit adapted to determine whether the first or second reading method is executed; an image processing unit adapted to execute processing of an image signal obtained by reading a document using the reader; and a coefficient setting unit adapted to set coefficients, which are used in at least the reader or the image processing unit, in accordance with the first or second reading method; wherein the reader and the image processing unit execute processing using the coefficients set by the coefficient setting unit so as to compensate for the difference between the spectral transmittances of the first and second holding members.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

First Embodiment

The structure of an image reading apparatus according to a first embodiment of the present invention will now be described with reference to FIGS. 1 to 4.

Figure 1:
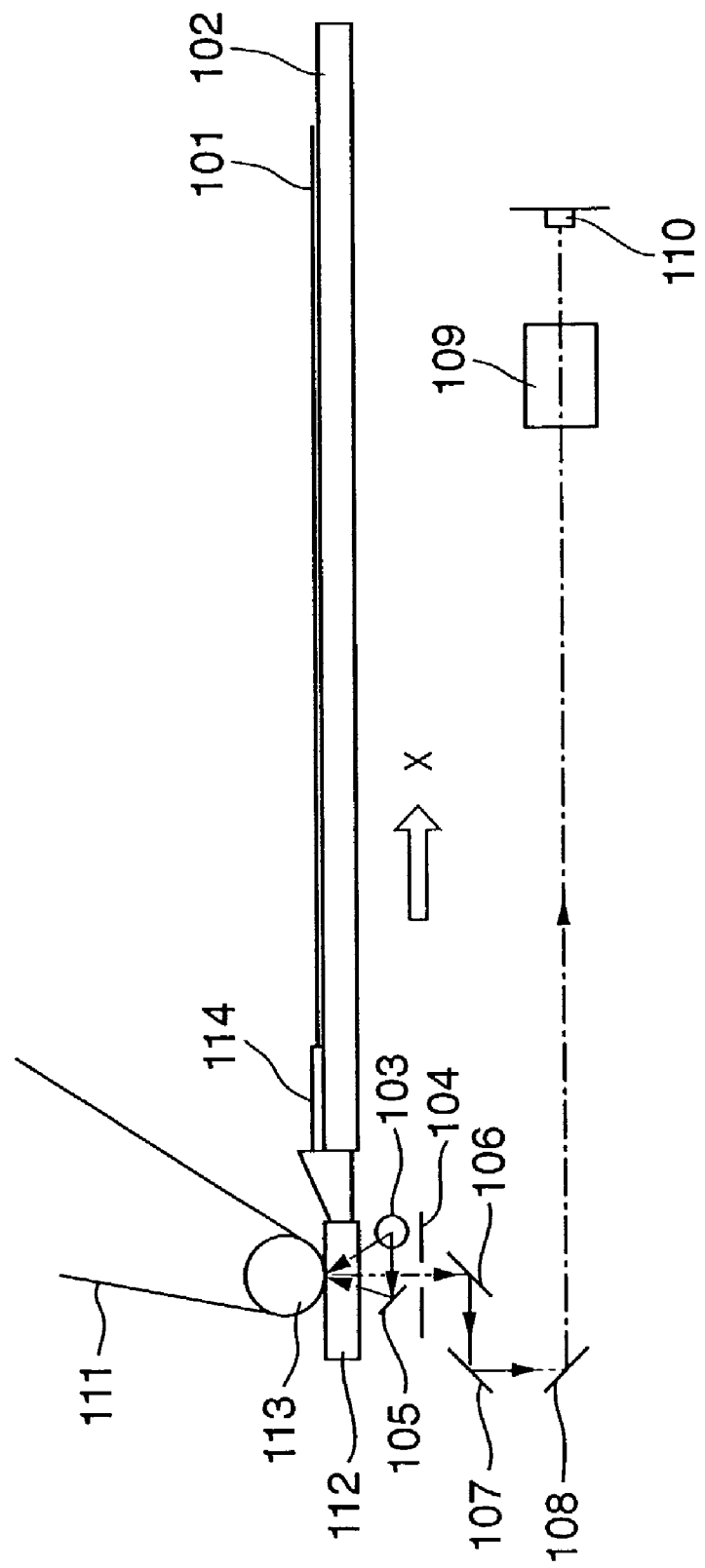
FIG. 1 is a diagram illustrating the main components of an image reading apparatus according to a first embodiment of the present invention.

FIG. 1 is a diagram illustrating the main components of an image reading apparatus according to a first embodiment of the present invention. The image reading apparatus shown in FIG. 1 is capable of implementing the flow-scan reading method whereby image information is read from documents successively while the documents are transported, and a fixed reading method whereby image information is read from a document while the document is held fixed.

As shown in FIG. 1, a first document 101, whose image information is to be read while the document is held fixed, is placed on a platen glass 102 provided at a location where the image information can be read by the fixed reading method. This apparatus includes a light source 103, a slit 104, a reflecting member 105, first, second and third mirrors 106, 107 and 108, respectively, an image forming lens 109, and a line sensor 110 such as a CCD. A second document 111 has its image information read while it is transported by an automatic document feeder, which is not shown. These documents can be transported one after another. A document transport glass 112 is provided at a location where the image information can be read from the document by the flow-scan reading method. The second document 111 passes by the upper side of the document transport glass 112. The second document 111 is transported by a roller 113. Numeral 114 denotes a shading reference member.

In the image reading apparatus set forth above, the flow-scan reading method is such that second documents 111 are transported one after another from the automatic document feeder (not shown). Each second document 111 is transported by the roller 113 and is caused to pass by above the document transport glass 112 the surface of which has been treated with an electrically conductive film and subjected to a treatment for lowering frictional resistance.

At this time the second document 111 is illuminated by the light source 103 (a xenon lamp having an aperture in this embodiment) via the reflecting member 105, the light reflected from the illuminated second document 111 passes through the slit 104 and the document image is formed on the image forming surface of the color line sensor 110 by the image forming lens 109 through the intermediary of the first, second and third mirrors 106, 107 and 108.

Thus, by merely providing a document reading section at the forward end of the image reading apparatus and providing a simple automatic document feeder to feed documents in order to implement the flow-scan reading method, the documents (limited to documents in the form of sheets) are feed automatically to make possible the flow-scan reading of color image information.

Since the second document 111 is transported and passes by the upper side of the document transport glass 112 that has been subjected to the conductive-film and low-friction treatments, a signal based upon the image information of the second document 111 in the main scanning direction thereof is obtained during transport in the sub-scanning direction, whereby the image information of the second document 111 is read.

In case of the fixed reading method, the first document 101, which has been placed on the platen glass 102 comprising ordinary glass whose surface has not been subjected to the conductive-film and low-friction treatments, is illuminated by the xenon light source 103, and light reflected from the illuminated first document 101 passes through the slit 104 and is acted upon by the image forming lens 109 so that an image is formed on the image forming surface of the color line sensor 110 via the first, second and third mirrors 106, 107 and 108, respectively.

Reading of color information from the first document 101 is performed by causing the slit 104 and first, second and third mirrors 106, 107 and 108 to scan the document in the sub-scanning direction (the X direction in FIG. 1).

By thus reading a document while the document is held fixed, it is possible to read color image information from a document bound in book form or from an original that is difficult to feed using an automatic document feeder, such as a thick document or thin fabric.

In an image reading apparatus of the above-described kind, in this embodiment the second document 111 is transported from the automatic document feeder to a point above the document transport glass 112. In order to facilitate transport of the second document 111 and deal with the attachment of contaminants such as dust or the like, the surface of the document transport glass 112 is provided with an electrically conductive film (referred to also as an "EC coat"), such as a film of ITO (Indium Tin Oxide), and is treated to lower the frictional resistance thereof.

The size of the platen glass 102 used in the fixed reading method, on the other hand, is greater than that of the first document 101, as shown in FIG. 1, and the document is not transported to the surface of the platen glass 102. In view of cost, therefore, the surface of the platen glass 102 is not subjected to the conductive-film and low-friction treatments.

Figure 2:
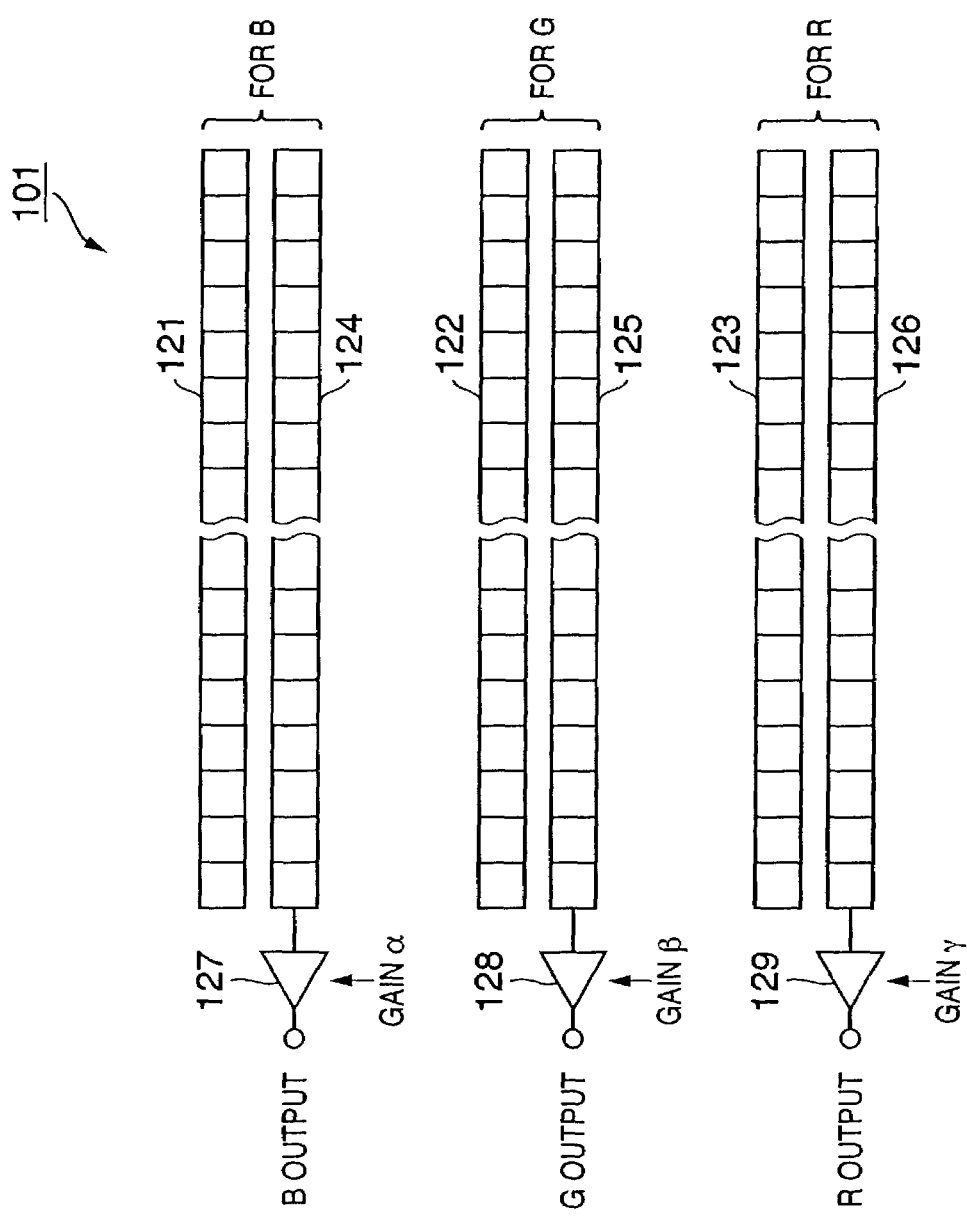
FIG. 2 is a diagram schematically illustrating the structure of a color line sensor according to the first embodiment.

FIG. 2 is a diagram schematically illustrating the structure of the color line sensor 110. As shown in FIG. 2, the color line sensor 110 includes B, G, R sensor portions 121, 122, 123, respectively, covered by B, G, R color filters, respectively, and comprising a plurality of pixels inclusive of an optoelectric converter; transfer portions 124, 125, 126 for transferring electric charge that has accumulated in the B, G, R sensor portions 121, 122, 123, respectively; and output amplifiers 127, 128, 129 for amplifying and outputting the electric charge transferred from the transfer portions 124, 125, 126, respectively.

Figure 3:
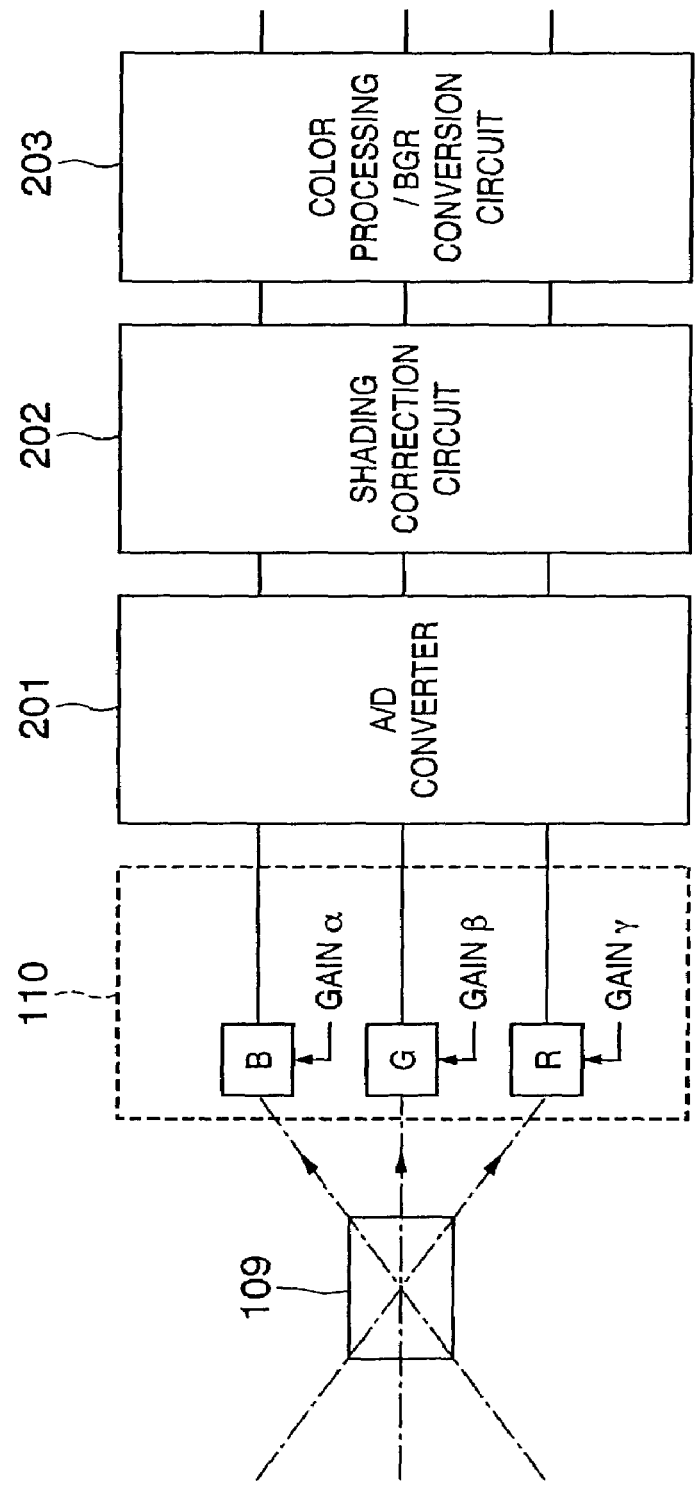
FIG. 3 is a diagram useful in describing image information processing executed in the image reading apparatus of the first embodiment.
Figure 4:
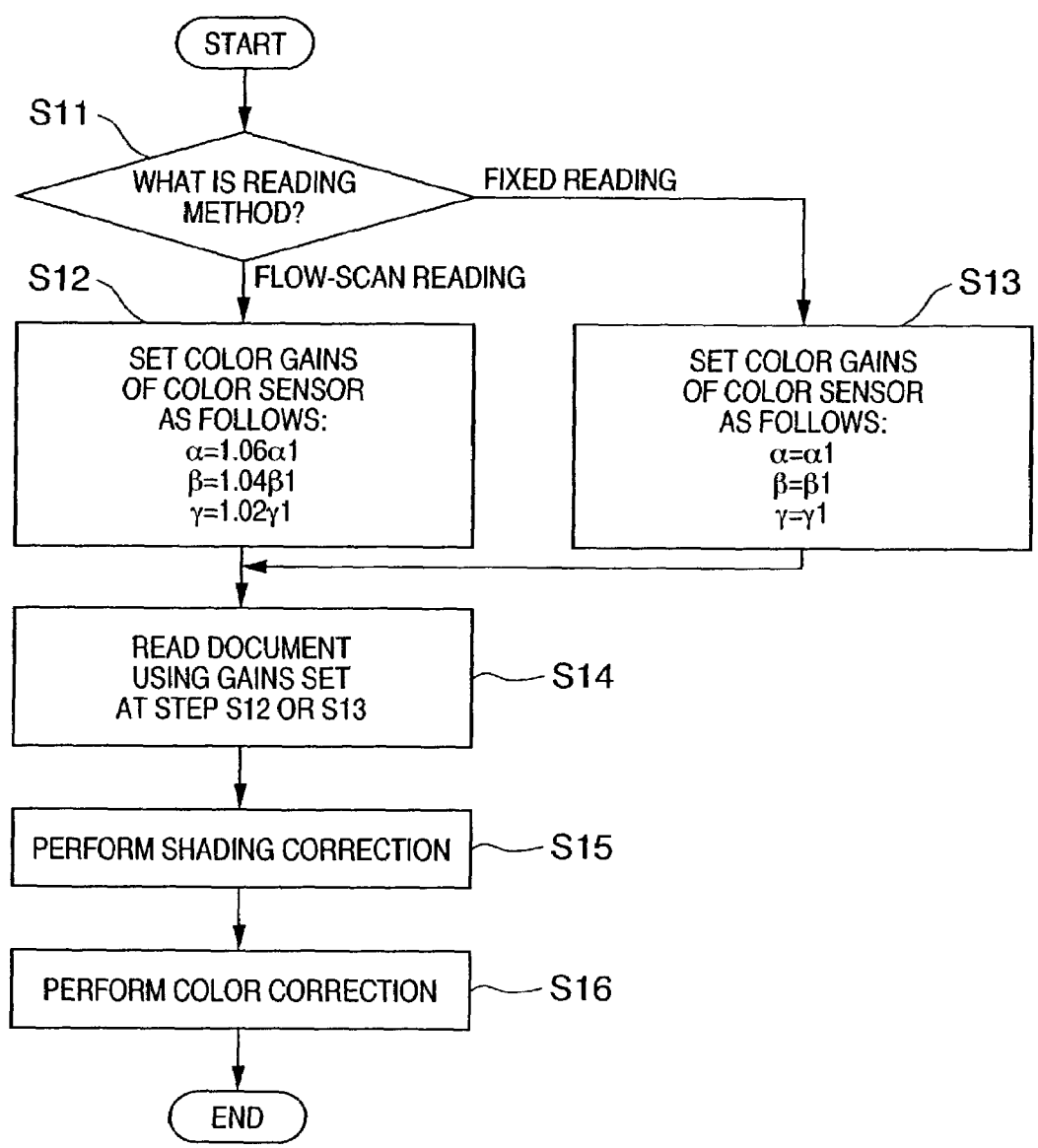
FIG. 4 is a flowchart useful in describing the operation of the first embodiment.

According to this embodiment, the above-described color image reading apparatus operates as shown in the flowchart of FIG. 4. Specifically, before reading begins, the apparatus discriminates the reading method (step S11) and independently varies gain quantities $\alpha$, $\beta$, $\gamma$ (steps S12, S13), which are applied to respective ones of the output amplifiers 124, 125, 126 of the line sensors of colors B (blue), G (green), R (red) in color line sensor 110, depending upon whether the reading method is the flow-scan reading method or fixed reading method, as illustrated in FIGS. 2 and 3.

Figure 8:
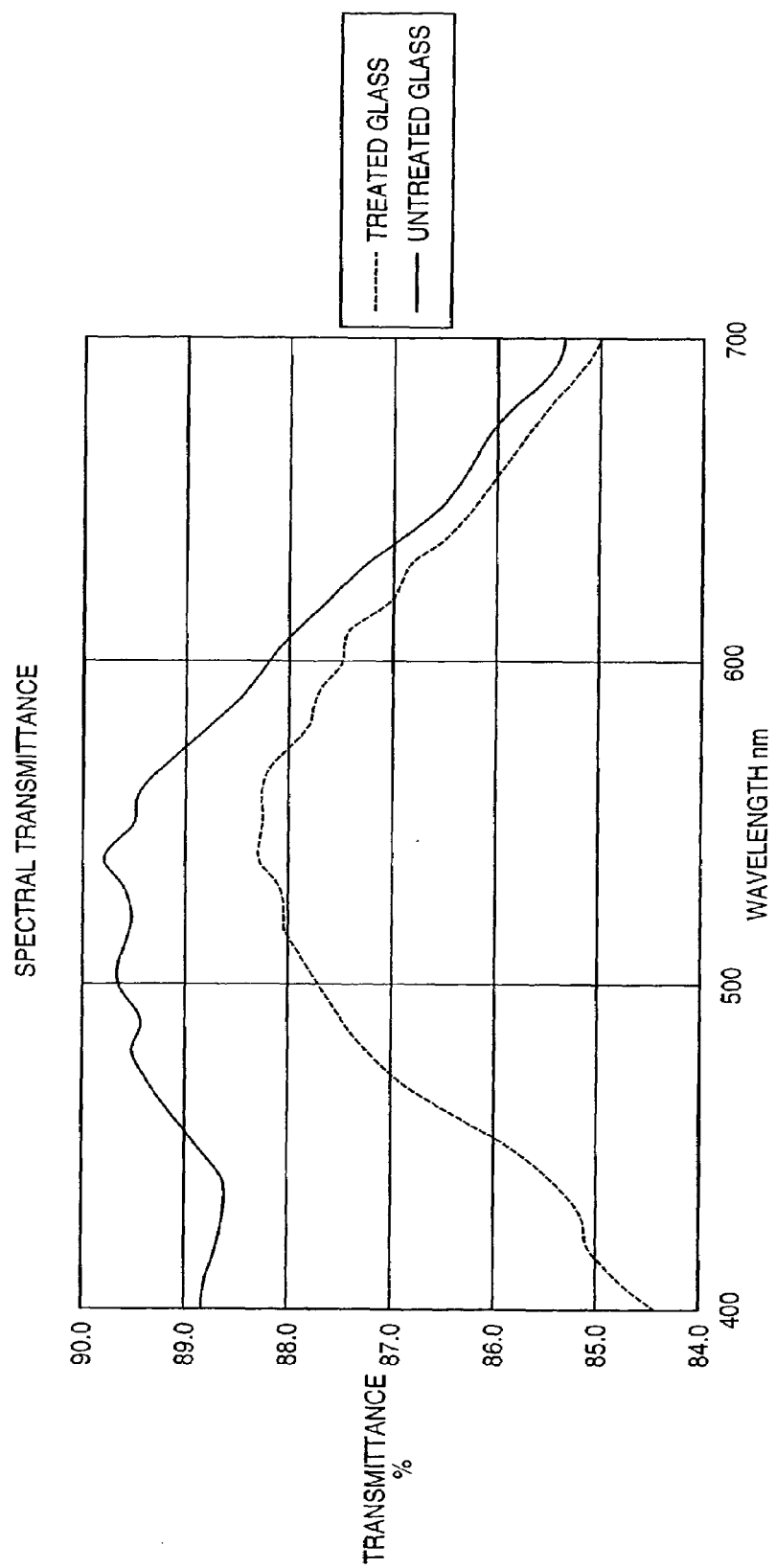
FIG. 8 is a graph illustrating the spectral transmittance of ordinary glass and of treated glass whose surface has been subjected to the conductive-film and low-friction treatments.

For example, the spectral transmittance of ordinary glass differs from that of glass whose surface has been subjected to the conductive-film treatment and low-friction treatment, as illustrated in FIG. 8. In general, glass whose surface has been subjected to the conductive-film treatment and low-friction treatment has a lower transmittance, with the difference being especially conspicuous on the side of short wavelengths.

Taking this factor into account, the image reading apparatus of this embodiment sets the amounts of gain α, β, γ, which are applied to respective ones of the B, G, R line sensors in color line sensor 110, to α1, β1, γ1, respectively (step S13) in case of the fixed reading method. When the reading method is the flow-scan reading method, on the other hand, the apparatus multiplies α, which corresponds to B, by 1.06 (=1.06×α1), multiplies β, which corresponds to G, by 1.04 (=1.04×β1), and multiplies γ, which corresponds to R, by 1.02 (=1.02×γ1) (step S12). By adopting this expedient, it is possible to reduce a decline in the outputs of the B, G, R color signals, which are obtained from the line sensor 110, caused by the decline in spectral transmittance of the document transport glass 112 for the flow-scan reading method relative to the platen glass 102 for the fixed reading method. Further, by multiplying α, which corresponds to B, by 1.06 (=1.06×α1), β, which corresponds to G, by 1.04 (=1.04×β1), and γ, which corresponds to R, by 1.02 (=1.02×γ1), as mentioned above, a change in the output ratio of B, G, R between the flow-scan reading method and fixed reading method can also be reduced, thereby reducing the occurrence of a difference in tone. It should be noted that the values of α, β, γ are not limited to those cited above and that these are set appropriately in accordance with the spectral transmittances of the platen glass 102 and document transport glass 112 so as to compensate for the difference between the spectral transmittances.

The image reading apparatus reads the document at step S14 using the gains set at step S12 or S13.

Shown in FIG. 3 are an A/D converter 201 for converting an analog signal to a digital signal, a shading correction circuit 202 for performing a shading correction, and a color processing/BGR conversion circuit 203 for executing color processing (color correction processing)/BGR conversion processing.

At step S15 in FIG. 4, each color signal that has been converted to a digital signal by the A/D converter 201 is subjected to a shading correction by the shading correction circuit 202. This is followed by step S16, at which a color correction is applied by the color processing/BGR conversion circuit 203.

Thus, in accordance with the first embodiment of the present invention as described above, signal reading processing and signal correction processing that differ depending upon whether the reading method is the flow-scan reading method or fixed reading method is executed, thereby making it possible to reduce the difference between image information obtained by the flow-scan reading method and image information obtained by the fixed reading method without causing an increase in cost.

Second Embodiment

A second embodiment of the present invention will now be described.

Figure 5:
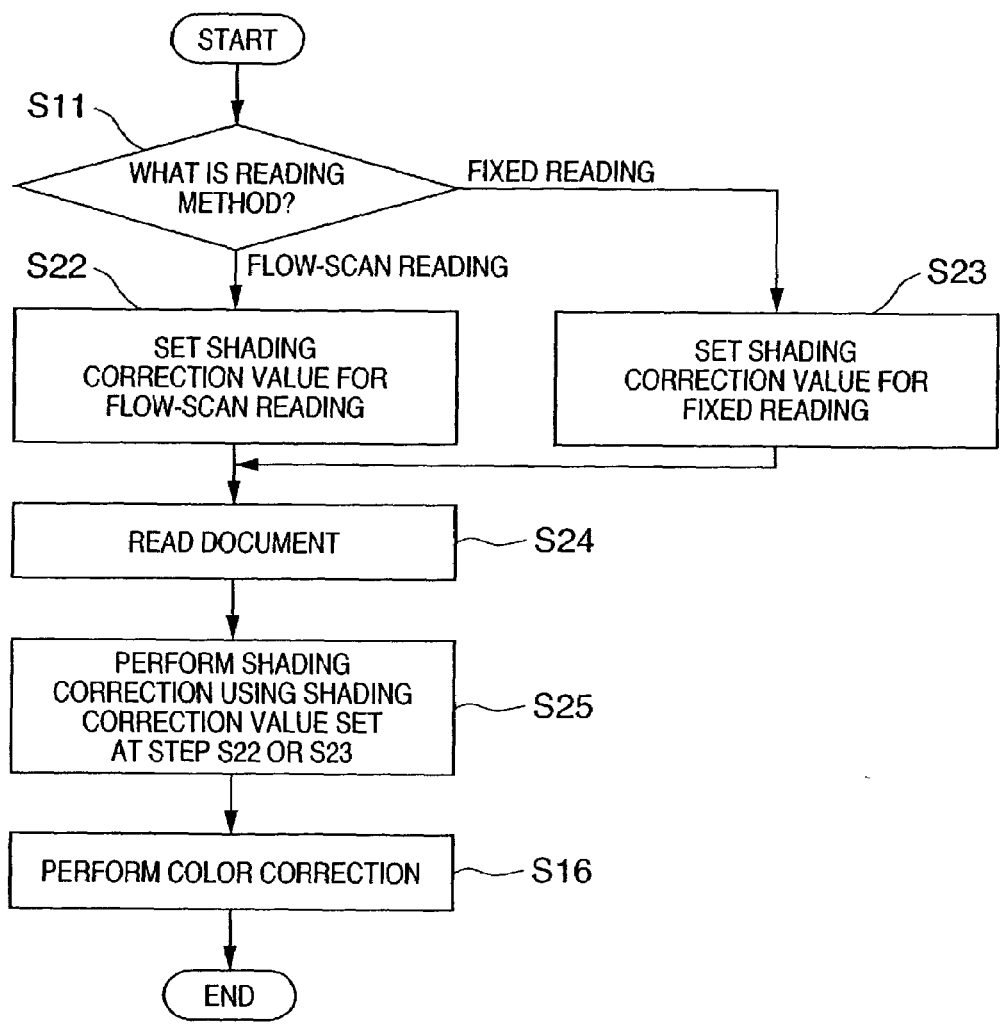
FIG. 5 is a flowchart useful in describing operation according to a second embodiment of the present invention.

The basic structure of the image reading apparatus according to the second embodiment is the same as that shown in FIGS. 1 and 3 of the first embodiment, and therefore this embodiment will be described with reference to these drawings. FIG. 5 is a flowchart illustrating an overview of processing executed in the second embodiment. Processing steps identical with those shown in FIG. 4 are designated by like step numbers and a description thereof is partially omitted.

In the second embodiment, the amount of the shading correction applied to a color image signal by the shading correction circuit 202 of FIG. 3 is changed depending upon whether the reading method is the flow-scan reading method or fixed reading method.

More specifically, before reading of a document begins, the apparatus discriminates the reading method (step S11). If the method is the flow-scan reading method, a shading correction value corresponding to the flow-scan reading method is set in the shading correction circuit 202 (step S22). If the method is the fixed reading method, a shading correction value corresponding to the fixed reading method is set in the shading correction circuit 202 (step S23).

For example, by reducing the shading value obtained from the shading reference member 114, which is used in the shading correction by the shading correction circuit 202, independently for each of B, G, R when the flow-scan reading method is in effect, a reverse correction is applied. As a result, it is possible to reduce a decline in the outputs of the B, G, R color signals, which are obtained from the line sensor 110, caused by the decline in spectral transmittance of the document transport glass 112 for the flow-scan reading method relative to the platen glass 102 for the fixed reading method, and to reduce a difference in tone ascribable to a change in the B, G, R output ratio.

The document is read at step S24 and the shading correction is applied to the read image signal at step S25 using the shading correction value set at step S22 or S23.

Third Embodiment

A third embodiment of the present invention will now be described.

Figure 6:
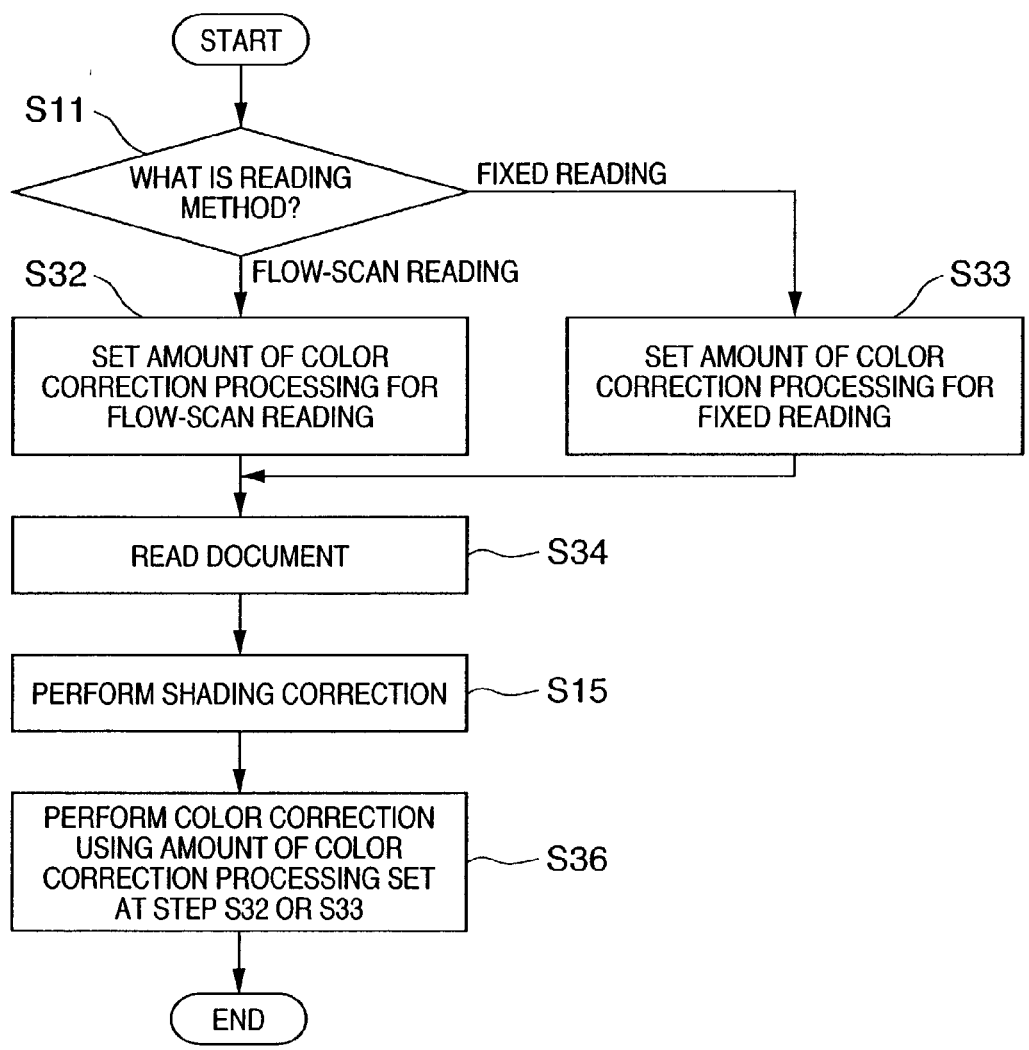
FIG. 6 is a flowchart useful in describing operation according to a third embodiment of the present invention.
Figure 7:
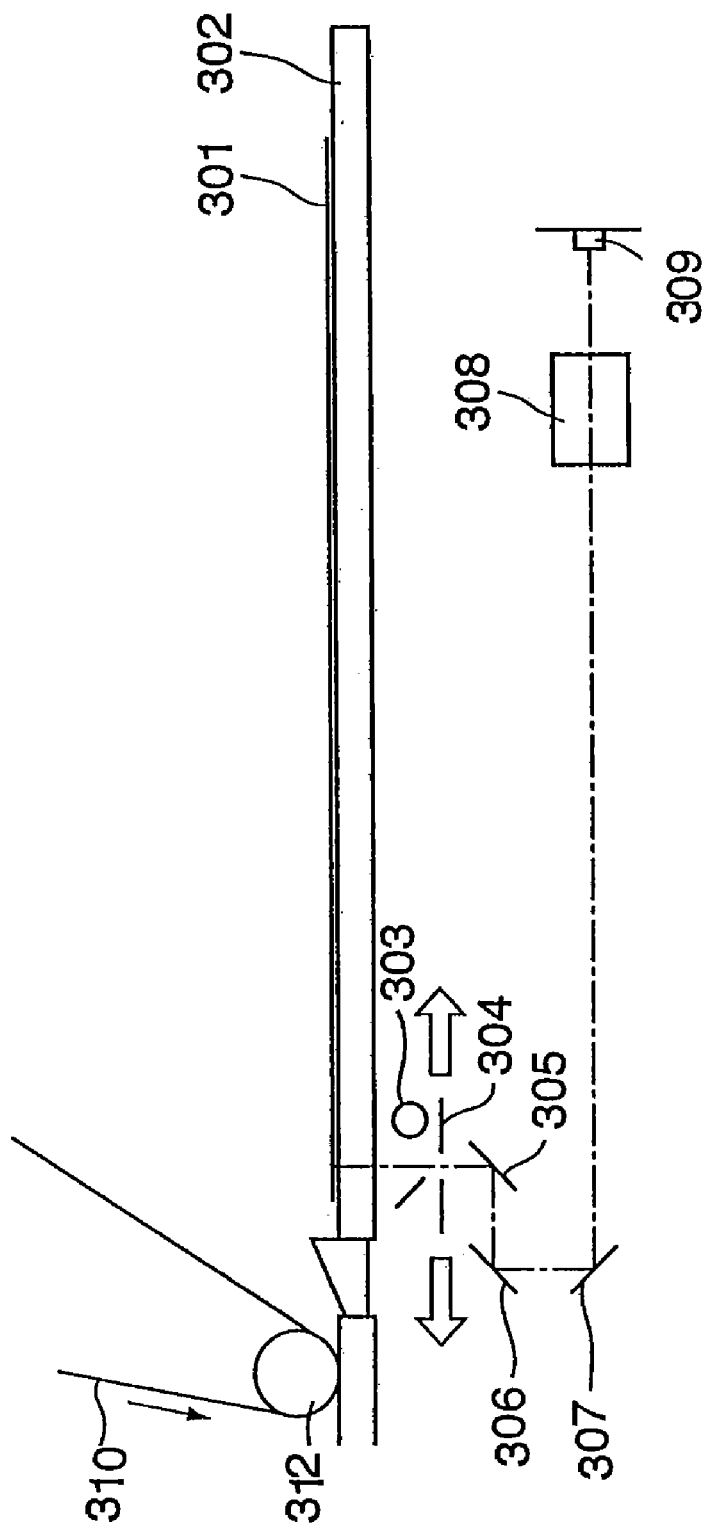
FIG. 7 is a diagram illustrating the main components of an image reading apparatus according to the prior art.

The basic structure of the image reading apparatus according to the third embodiment is the same as that shown in FIGS. 1 and 3 of the first embodiment, and therefore this embodiment will be described with reference to these drawings. FIG. 6 is a flowchart illustrating an overview of processing executed in the third embodiment. Processing steps identical with those shown in FIG. 4 are designated by like step numbers and a description thereof is partially omitted.

In the third embodiment, the method of color processing (color correction processing) executed by the color processing/BGR conversion circuit 203 of FIG. 3 is changed depending upon whether the reading method is the flow-scan reading method or fixed reading method.

More specifically, before reading of a document begins, the apparatus discriminates the reading method at step S11. If the method is the flow-scan reading method, an amount of color correction processing corresponding to the flow-scan reading method is set in the color processing/BGR conversion circuit 203 (step S32). If the method is the fixed reading method, an amount of color correction processing corresponding to the fixed reading method is set in the color processing/BGR conversion circuit 203 (step S33).

That is, B, G, R signals corresponding to the respective colors are obtained from the line sensor 110. Usually these signals are added or subtracted and color processing is applied to produce a signal.

By applying an amount of color processing (color correction processing), which is executed by the color processing/BGR conversion circuit 203 in the flow-scan reading method and fixed reading method, independently so as to cancel out the difference between the spectral transmittance of ordinary glass and the spectral transmittance of glass that has been subjected to the conductive-film treatment and low-friction treatment, it is possible to reduce a decline in the outputs of the B, G, R color signals and a difference in color tone that is ascribable to a change in the output ratio of B, G, R.

The document is read at step S34, the shading correction is applied to the read image signal at step S15 and color correction processing is executed at step S36 using the amount of color correction processing set at step S32 or S33.

Fourth Embodiment

A fourth embodiment of the present invention will now be described.

The basic structure of the image reading apparatus according to the fourth embodiment is the same as that shown in FIGS. 1 and 3 of the first embodiment, and therefore this embodiment will be described with reference to these drawings.

According to the fourth embodiment, processing in accordance with at least two of the foregoing embodiments is executed simultaneously.

More specifically, the processing operation of the first embodiment, in which the gain quantities α, β, γ applied to the B, G, R line sensors in the line sensor 110 are changed independently depending upon whether the reading method is the flow-scan reading method or fixed reading method, and the processing operation of third embodiment, in which the color processing (color correction processing) is changed depending upon whether the reading method is the flow-scan reading method or fixed reading method, are executed simultaneously, thereby making it possible to reduce a decline in the outputs of the B, G, R signals and a difference in tone ascribable to a change in the B, G, R output ratio.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIG. 4, 5, 6, or combinations thereof described in the embodiments.

The present invention is not limited to the above embodiments and various changes and modifications can be made within the spirit and scope of the present invention. Therefore to apprise the public of the scope of the present invention, the following claims are made.

What is claimed is:

1. A method of reading images in an image reading apparatus capable of selectively executing a first reading method in which a document is read while the document is transported in a state in which a reader is fixed at a predetermined location, and a second reading method in which a document is read while the reader is moved in a predetermined direction in a state in which the document is held fixed, said apparatus having a first holding member for holding a document at the predetermined location for implementation of the first reading method, and a second holding member, which has a spectral transmittance different from that of said first holding member, for holding a document for implementation of the second reading method, said method comprising:

a determination step of determining whether the first or second reading method is executed;

a reading step of reading a document by the reader;

an image processing step of executing processing of an image signal obtained at said reading step; and a coefficient setting step of setting coefficients, which are used in at least said reading step or said image processing step, in accordance with the first or second reading method;

wherein processing is executed at said reading step and said image processing step using the coefficients set at said coefficient setting step so as to compensate for the difference between the spectral transmittances of said first and second holding members.

2. The method according to claim 1, wherein the reader reads a document and outputs the document separately as image signals of a plurality of colors, and the coefficients include gain applied to the image signal of each color by the reader.

3. The method according to claim 1, wherein the coefficients include shading correction values.

4. The method according to claim 1, wherein the coefficients include amount of color correction processing.

5. An image reading apparatus capable of selectively executing a first reading method in which a document is read while the document is transported in a state in which a reader is fixed at a predetermined location, and a second reading method in which a document is read while the reader is moved in a predetermined direction in a state in which the document is held fixed, said apparatus comprising:

a first holding member adapted to hold a document at the predetermined location for implementation of the first reading method;

a second holding member, which has a spectral transmittance different from that of said first holding member, adapted to hold a document for implementation of the second reading method;

a determination unit adapted to determine whether the first or second reading method is executed;

an image processing unit adapted to execute processing of an image signal obtained by reading a document using the reader; and a coefficient setting unit adapted to set coefficients, which are used in at least said reader or said image processing unit, in accordance with the first or second reading method;

wherein said reader and said image processing unit execute processing using the coefficients set by said coefficient setting unit so as to compensate for the difference between the spectral transmittances of said first and second holding members.

6. The apparatus according to claim 5, wherein the reader reads a document and outputs the document separately as image signals of a plurality of colors, and the coefficients include gain applied to the image signal of each color by the reader.

7. The apparatus according to claim 5, wherein the coefficients include shading correction values.

8. The apparatus according to claim 5, wherein the coefficients include amount of color correction processing.

9. The apparatus according to claim 5, wherein said first holding member has been subjected to a surface treatment different from that of said second holding member.

10. A computer program product comprising a computer usable medium having computer readable program code means embodied in said medium for a method of reading images in an image reading apparatus capable of selectively executing a first reading method in which a document is read while the document is transported in a state in which a reader is fixed at a predetermined location, and a second reading method in which a document is read while the reader is moved in a predetermined direction in a state in which the document is held fixed, said apparatus having a first holding member for holding a document at the predetermined location for implementation of the first reading method, and a second holding member, which has a spectral transmittance different from that of said first holding member, for holding a document for implementation of the second reading method, said product including:

first computer readable program code means for determining whether the first or second reading method is executed;

second computer readable program code means for reading a document by the reader;

third computer readable program code means for executing processing of an image signal obtained by reading the document;

fourth computer readable program code means for setting coefficients, which are used by at least said second or third computer readable program code means, in accordance with the first or second reading method, wherein processing is executed by said second and third computer readable program code means using the coefficients set by said fourth computer readable program code means so as to compensate for the difference between the spectral transmittances of said first and second holding members.

* * * * *